C. BARTLETT.
Dish-Washers.

No. 145,042.

Patented Dec. 2, 1873.

WITNESSES
Sydney R. Burleigh
Joseph H. Lewis

INVENTOR
Charles Bartlett

UNITED STATES PATENT OFFICE.

CHARLES BARTLETT, OF PROVIDENCE, RHODE ISLAND.

IMPROVEMENT IN DISH-WASHERS.

Specification forming part of Letters Patent No. 145,042, dated December 2, 1873; application filed September 20, 1873.

*To all whom it may concern:*

Be it known that I, CHARLES BARTLETT, of Providence, in the county of Providence and State of Rhode Island, have invented certain Improvements in Dish-Washers; and I do hereby declare the following to be a true and exact description thereof, reference being had to the accompanying drawings and to the letters of reference marked thereon.

Figure 1:
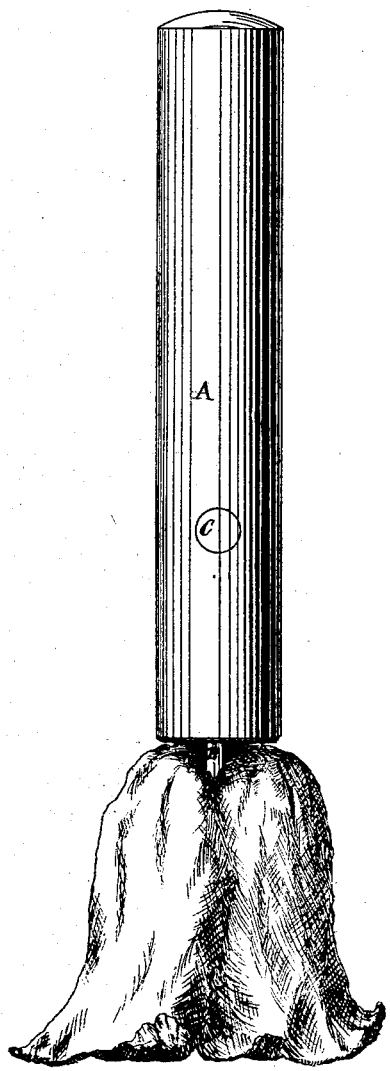
Figure 2:
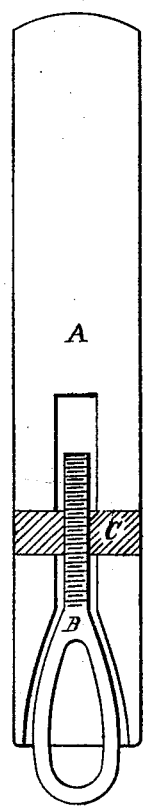
Figure 3:
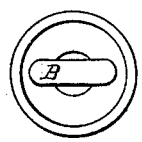

Figure 1 is an elevation. Fig. 2 is a sectional view through handle. Fig. 3 is an end view of handle and eyebolt.

To enable others to make and use my invention, I will now proceed with a description.

My invention refers to a simple mode of fastening pieces of cloth, yarn, twine, or any flexible material suitable for washing purposes, without regard to size or shape, to a handle, for washing dishes, kettles, pans, &c.

The handle A can be made of wood or any soft material, such as rubber and leather, and of any length, size, and shape to give it a neat appearance. The handle A is recessed in far enough to admit eyebolt B, as shown in the drawing; also, it holds the nut C, in which the end of eyebolt is made to traverse. The eyebolt B and nut C are made of wrought or malleable metals and coated, so as not to corrode. The end of eyebolt B is made so as to turn in and traverse the nut C, the nut C being fastened into handle A.

To fasten the material to be used to the handle, remove the eyebolt B far enough to admit the material to be put into the eye, and then, by turning the eyebolt into the nut, it will hold the material firmly for the purpose specified.

Lamp-chimney cleaners have been made with wire staples driven into a handle, but these are not claimed.

Having thus described my improvement, what I claim as my invention, and desire to secure by Letters Patent, is—

The combination, in a dish-washer, as shown and described, of the recessed handle A, eyebolt B, and nut C, as and for the purpose specified.

CHARLES BARTLETT.

Witnesses:
E. H. COOK,
JOSEPH H. LEWIS.